(12) United States Patent
Chouinard et al.

(10) Patent No.: US 7,716,203 B2
(45) Date of Patent: May 11, 2010

(54) METHOD AND SYSTEM FOR TRACKING, EVALUATING AND RANKING RESULTS OF MULTIPLE MATCHING ENGINES

(75) Inventors: Karen Dixon Chouinard, Aurora (CA); Mohammad Khatibi, Richmond Hill (CA); Sachin Wadhwa, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/848,535

(22) Filed: Aug. 31, 2007

(65) Prior Publication Data

US 2009/0063456 A1 Mar. 5, 2009

(51) Int. Cl.
*G06F 17/30* (2006.01)
(52) U.S. Cl. .................. 707/706; 707/813
(58) Field of Classification Search ............... 707/206, 707/1–4, 6, 10, 100, 101, 200, 201, 102
See application file for complete search history.

(56) References Cited

U.S. PATENT DOCUMENTS

| | | | |
|---|---|---|---|
| 6,327,597 B1* | 12/2001 | McKinley et al. | 707/206 |
| 6,728,704 B2 | 4/2004 | Mao et al. | |
| 7,376,697 B2* | 5/2008 | Koskimies | 709/203 |
| 2005/0091174 A1 | 4/2005 | Akkiraju et al. | |
| 2006/0155739 A1* | 7/2006 | Broder et al. | 707/102 |
| 2006/0200455 A1* | 9/2006 | Wilson | 707/4 |
| 2007/0271228 A1* | 11/2007 | Querel | 707/3 |
| 2008/0201304 A1* | 8/2008 | Sue | 707/3 |

FOREIGN PATENT DOCUMENTS

| | | |
|---|---|---|
| EP | 0135270 A1 | 6/2001 |
| EP | 1158421 A2 | 11/2001 |
| WO | 0171562 A2 | 9/2001 |
| WO | 2005020106 A1 | 3/2005 |

OTHER PUBLICATIONS

Howe, Adele E., "SavvySearch: A Meta-Search Engine that Learns Which Search Engines to Query," Jan. 28, 1997, pp. 1-12.
Smith, LaQuiesia S. et al., "A Search Engine Selection Methodology", Computer Society, Proceedings of the International Conference on Information Technology: Computers and Communications (ITCC '03), 2003 IEEE, 8 pages.
Judit Bar-Ilan, "Comparing rankings of search Results on the Web", Information Processing and Management 41, Elsevier Ltd., 2005. pp. 1151-1519.
Dr. John Salerno, et al., "Fusing Multiple Search Results Together", Data Mining and Knowledge Discovery: Theory, Tools, and Technology V, Proccedings of SPIE vol. 5098. 2003. pp. 155-165.

* cited by examiner

*Primary Examiner*—Mohammad Ali
*Assistant Examiner*—Marc R Filipczyk
(74) *Attorney, Agent, or Firm*—Patterson & Sheridan, LLP

(57) ABSTRACT

The present invention in various implementations provides for a method and system for removing suspect duplicate data in a database having a plurality of datasets for a suspect processing transaction, using a plurality of matching engines, comparing results of matching engines in a logically predetermined comparative assessment, and thereafter providing an ordered priority of results of matching engines to identify suspect candidates.

14 Claims, 3 Drawing Sheets

100

200

300

METHOD AND SYSTEM FOR TRACKING, EVALUATING AND RANKING RESULTS OF MULTIPLE MATCHING ENGINES

FIELD OF THE INVENTION

The present invention relates generally to transactional searching and more specifically to a method and system for comparing predefined data characteristics in a predetermined manner.

BACKGROUND OF THE INVENTION

Customer records and varied information that are often a part of complex data systems and business applications present a variety of challenges in management, identification, analysis and segregation, for example. It is generally believed, based on estimates in certain industries, that the amount of unstructured data that may reside in planned and developing databases could easily exceed eighty percent. With such an amount of unstructured data, additional complexities arise, especially when the data is present on different platforms, is of varying freshness, and may be inconsistent across the platforms.

Determining which records are duplicates of one another, for instance, where within a complex data system there may exist multiple databases, each having records comprising particular data within, can be a particularly difficult issue. Quality issues also arise in which data stewardship matters become a central concern. Further, in matters concerning customer relationship management (CRM) which often necessitate data integrity to realize optimal returns on data structure investments, removing "bad customer data" and especially duplicate customer data is of key concern.

The IBM Websphere® Customer Center (WCC) is a real-time, service-oriented customer application that provides users with a single view of the customer and also with business processes which provide for maintaining customer data shared between a front and back office arrangement. The WCC effectively acts as an intelligent customer data hub to manage customer data through its Customer Master Data Management (CMDH) hub. Via the CMDH, the WCC manages business rules, event detection, data validation and duplicate suspect processing (DSP). While other vendors have attempted to merely singly match search results to transactional records as a solution to searching in response to the issues raised previously, the WCC via its DSP, enables a client to persist and process duplicate suspects of any customer (i.e., customer data) in the system.

In operation, the DSP searches for potential suspect candidates for a given customer (or party as used herein) and then provides the suspect candidate list to a matching engine which then scores values for each of the candidates residing on the list of suspect candidates. The DSP creates a suspect table (i.e., SuspectTable) as part of the process. The values determined by the DSP in this process are then assessed to determine similarity or dissimilarity as between candidate suspects.

A challenge in the process of assessment of candidate suspects, is the final decision to remove customer data that only appears to be "similar" to that of other data in the system. In particular, the deletion of one set of customer data based on the similar presence of a second but different set of other customer data also present, in relation to a determinative evaluation by a single matching engine and its respective scoring scheme, without a significant confidence of accuracy, is often disconcerting to business management. Typically then, for business management to gain additional confidence in the initial determination of results to make a final decision, further analysis is often conducted and additional searching, comparison, scoring and assessments are performed over time in multiples "passes" on data which is then both different in content and time-value to the original data analyzed.

Unfortunately, as a result, business management may often have multiple results and suspects created for data sets which are neither static nor original in content when compared to the initial set of data, thereby creating further hesitation and confusion in making a final decision. Operatively, data users typically direct findings determined from the traditional process above for further integration steps and processes, thereby creating multiple reviews and assessment passes. Certain of these additional integration activities may involve further matching engine investigation or analysis tool, undertaking data transformation steps, and using Extract, Transform and Load (ETL) tools, for instance.

It is therefore desirable to have an improved method for determining and identifying, in one pass and with heightened confidence, suspect candidates from customer data in relation to results of a plurality of predetermined matching engines via comparative assessments at a predefined time. The present invention addresses such a need.

SUMMARY OF THE INVENTION

The present invention in accordance with various implementations, provides for a method for removing suspect duplicate data in a database having a plurality of datasets with predefined searchable informational characteristics for a suspect processing transaction, comprising: selecting a plurality of matching engines, each matching engine capable of creating information for its respective suspect tables and determining its respective weights and scores; gathering associated records from said datasets for analysis; defining one or more external logics having logic criteria for: relating results of said matching engines for comparative assessment in a predetermined manner and providing ordered priority of results of matching engines to identify suspect candidates; creating said information in said respective suspect tables; determining said respective weights and scores from said matching engines in accordance with said predetermined manner and said logic criteria; and producing a result having a presence or absence of suspect candidates in relation to said plurality of datasets.

The present invention in accordance with various implementations is a computer program product for identifying and ranking in one pass suspect duplicate data in a database having a plurality of datasets with predefined searchable informational characteristics for a suspect processing transaction, the computer program product comprising a computer-readable storage medium having computer-readable program code portions stored therein, the computer-readable program code portions comprising: a first executable portion capable of selecting a plurality of matching engines, each matching engine capable of creating information for its respective suspect tables and determining its respective weights and scores; gathering associated records from said datasets for analysis; defining one or more external logics having logic criteria for: relating results of said matching engines for comparative assessment in a predetermined manner and providing ordered priority of results of matching engines to identify suspect candidates; creating said information in said respective suspect tables; determining said respective weights and scores from said matching engines in accordance with said predetermined manner and said logic criteria; and producing a result having a presence or absence of a suspect candidate in relation to said plurality of datasets.

DETAILED DESCRIPTION

The present invention relates generally to transactional searching and more specifically to a method and system for comparing predefined data characteristics in a predetermined manner using a plurality of predetermined matching engines.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention in various implementations, provides for an improved method for determining and identifying, with heightened confidence, suspect candidates from customer data in relation to a plurality of predetermined matching engines for comparatively assessing in a predefined manner predefined characteristics of individual results of said matching engines in relation to a plurality of customer data.

Figure 1:
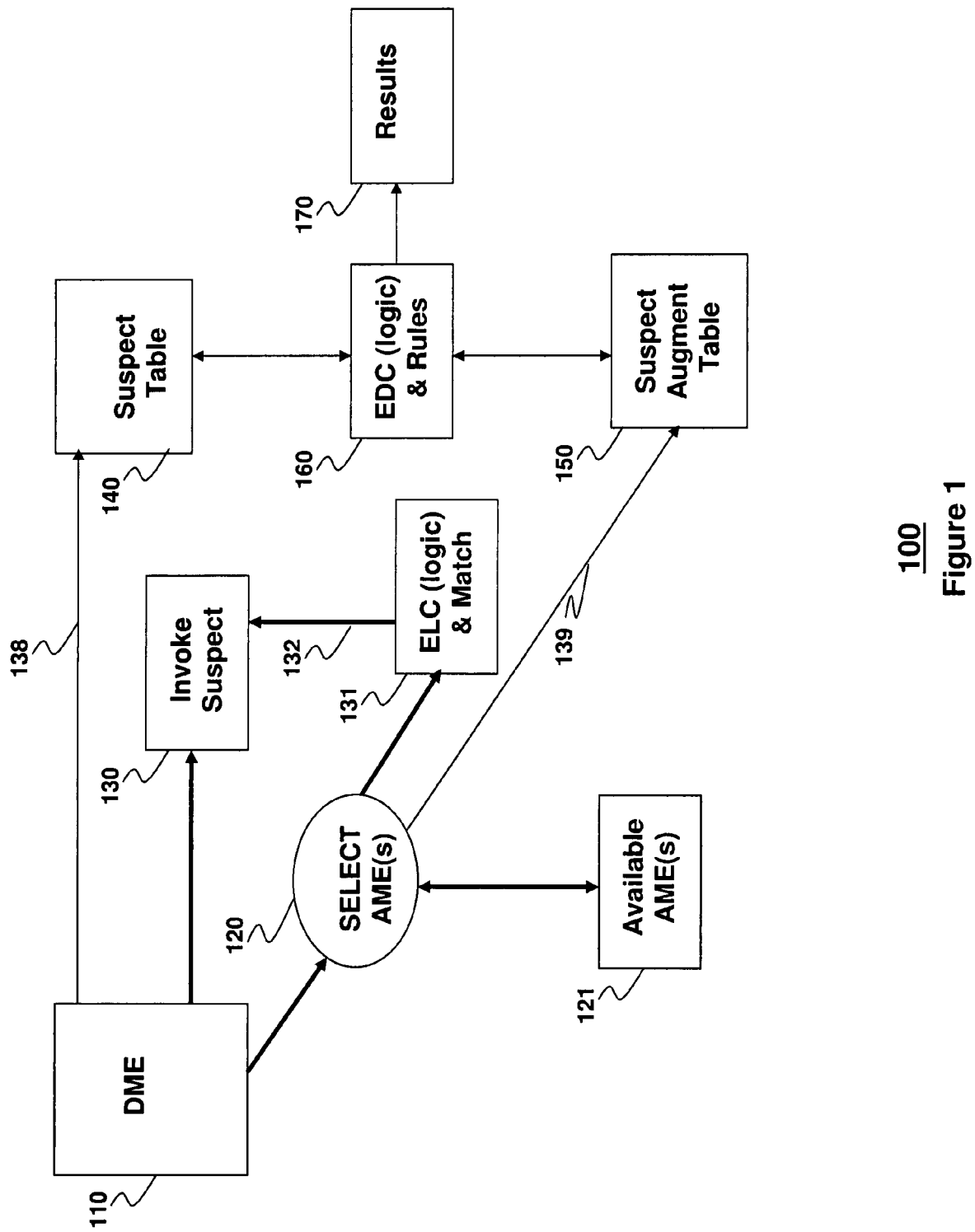
FIG. 1 shows a process flow of the present invention in accordance with an implementation thereof.

FIG. 1 shows a process flow 100 of the present invention in accordance with an implementation thereof;

In FIG. 1, a default matching engine (DME), capable of determining weights and scores based upon a predefined set of data interests or characteristics, is predetermined (i.e., defined) at 110 by a data user or is pre-programmed to be of a default value. A DME may be any of a group of known matching engines, developed matching engines now or in the future, or a customized solution. One or more auxiliary matching engines (AMEs) may then be selected at 120 by a data user or in accordance with a data program predefined to have selected certain AMEs. The selection of AMEs may be determined at 121 in relation to external rules for instance for a particular transaction type (i.e., addParty, updateParty, etc.).

From the implementation depicted in FIG. 1, when a persisting transaction or internal function that invokes a suspect processing, for instance, is submitted to the system at 130, the suspect records are populated based on the results of the DME of 110. An external logic component (ELC) at 131, (which may be a means, program, software, control, etc., or any combination of one or more thereof) will then determine, based upon a predefined set of logic criteria with actions for relationally matching (i.e., "match") at 131, whether one or more of the AMEs of 120 will be used to further assess the DME's (110) determined weights and scores.

Where it is determined that one or more AMEs will be used to assess the DME's determined weights and scores at 131, the selected or matched one or more AMEs will be invoked in a manner of one of either real-time or near real-time at 132. The DME will persist the suspect information at 138 to the suspect table 140 and the AMEs will update the suspect information at 139 by persisting records in the Suspect Augment table at 150. At 150, data for a Suspect Augmentation table is created for the suspect candidates of the invoked suspects of 130.

Further from the implementation depicted in FIG. 1, an external default logic (EDC) and rules execution at 160 (which may be a means, program, software, control, etc., or any combination of one or more thereof), and in an alternate implementation may be the same as the ELC of 131, provides priority over the matching engine results that are assessed by the various matching engines, DME and AMEs, in order to identify the effective suspect type and effective matching engine(s), as well preferably the comparative similarity and dissimilarity between the customer data and suspect candidates, to produce the results at 170. Preferably, the EDC 160 is predefined in relation to the data user's needs.

In one particular implementation the EDC is predefined to be of the following ordered arrangement:

If present, matching engine 1 matching result precedes matching engine 2 matching result, if present, and which precedes matching engine 3 matching result if present;

where in the above logic flow, a matching engine may be a commercial matching engine such as WCC, a customized or unique solution, or similar.

In another implementation, Weight, Matching Engine and Suspect Category are added to a SuspectTable to maintain the current status of a suspect record. A new table, SuspectAugment, is also introduced to maintain the result of all match operations that have been executed on a single suspect record. For a single suspect, the SuspectAugment table can hold multiple records to maintain the Matching Engine, Weight, Suspect Category and Augmentation Reason resulting from different matching engines.

Figure 2:
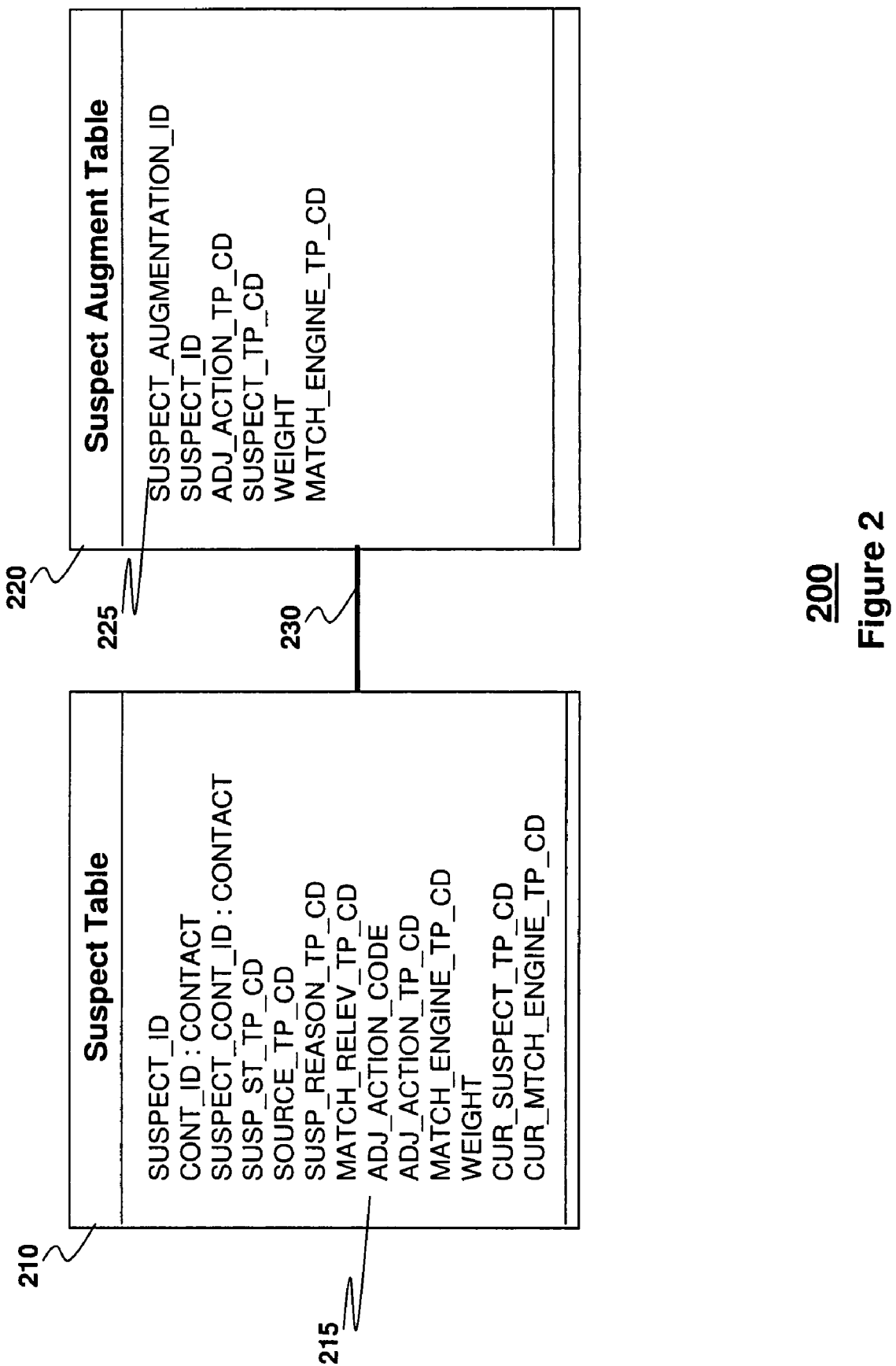
FIG. 2 shows a Suspect Table and a Suspect Augment Table in relation to one another, in accordance with an implementation of the present invention; and, FIG. 3 shows a particular implementation of a process flow of the method of the present invention.

FIG. 2 shows a Suspect Table (210) and a Suspect Augment Table (220) in relation to one another 200, in accordance with an implementation of the present invention. From FIG. 2, information obtained in varied customer data sets is available, along with matching engine and other comparative data interests at 215 for the Suspect Table 210 and at 225 for the Suspect Augment Table 220. At 230 is a relational inference to show that the data of one table is available to the data of another in a predefined manner. The data interests at 215 and 225 may also be understood to be informational characteristics of records, data or datasets, that are searchable or determinable for their respective data or datasets.

In a further implementation of the present invention, by example and not of limitation, the information on the strength of similarity and dissimilarity between the customer data and its suspect candidates ("comparative information") are maintained with the following entities in the context of suspect: matching score, non-matching score, matching engine weight, matching weight. Other information relations are envisioned to form comparative information as well, in view of a data user's needs in particular. Further, the result of invoking one or more different matching engines in relation to the same suspect record is also maintained in the separate table, SuspectAugment.

A data user, in a further implementation of the present invention, may implement a getSuspect transaction to view the matching results from the DME and the developed or resulting augmentations of the AMEs.

Operationally, by example then, in an addParty transaction where there are three matching engines (one DME and two AMEs), a DME is first selected, a commercial matching engine is enabled via an external rule with a synchronous mode of operation, and a second commercial matching engine is enabled via an external rule with an asynchronous mode of operation. One of the commercial matching engines may be that of a WCC customized matching engine for instance, where such may a DME as well.

Figure 3:
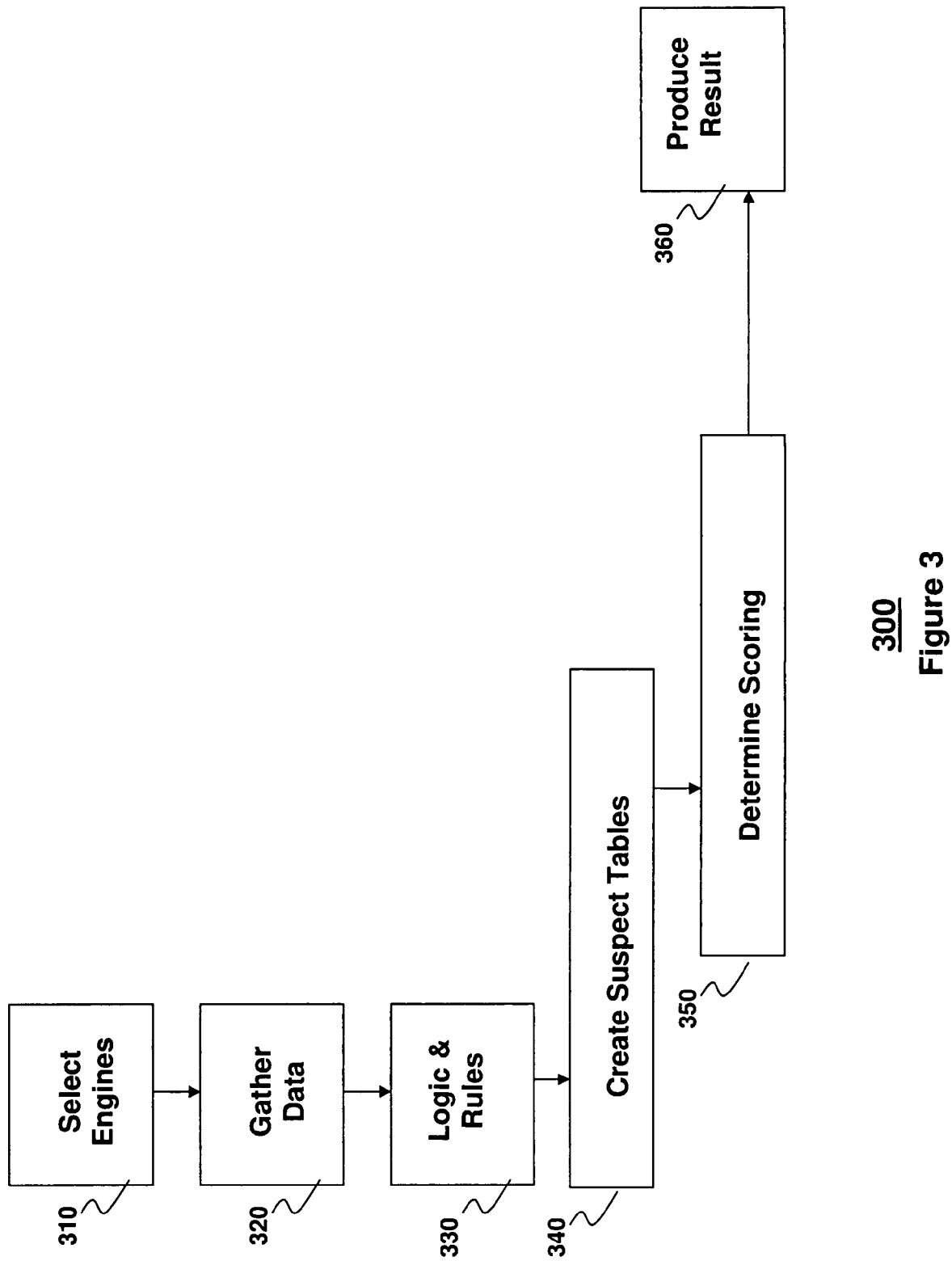

FIG. 3 shows a particular implementation of a process flow 300 of the method of the present invention.

In the implementation of FIG. 3, a method for removing suspect duplicate data in a database, having a plurality of datasets with predefined searchable informational characteristics is set forth.

From FIG. 3, the method comprises: (i) selecting a plurality of matching engines at 310, where each matching engine is capable of creating information for its respective suspect tables and determining its respective weights and scores; (ii) gathering associated records from said datasets for analysis at 320; (iii) defining one or more external logics at 330 having logic criteria for relating results of said matching engines for comparative assessment in a predetermined manner and providing ordered priority of results of matching engines to identify suspect candidates; (iv) creating said information in said respective suspect tables at 340; (v) determining said respective weights and scores from said matching engines in accordance with said predetermined manner and said logic criteria at 350; and (vi) producing a result at 360 having a presence or absence of a suspect candidate in relation to said plurality of datasets.

The inclusion of an AME type or of a specific named matching engine as an AME is limited only to those matching engines which are acceptable and interoperable with a matching engine interface of a system of the present invention. It is envisioned that the interface would be inclusive of a designated party matcher styled interface which would accept current (e.g., Abilitec, QualtyStage, etc.) and future developed matching engines.

The present invention and its various implementations overcomes the limitations and inefficiencies in the field as the present invention, in one implementation or another: i) improves the overall integrity of individual data within one or more datasets; ii) improves the data integrity across a data system at predefined time independent of individual data platform; iii) provides the ability for a data user to obtain a plurality of results from predetermined matching engines in more than one manner; iv) provides for a deterministic or a probabilistic approach for interpretation and assessment of one or more results obtained; v) provides for the ability to invoke any predetermined matching engine in either of real-time or near real-time operational mode, and vi) provides improved confidence to a data user that a final decision based on the results of the improved method are suitable for certain customer data deletion, merger, or other modification.

For performance consideration, data users can also customize the application in order to utilize the default deterministic matching engine as the real-time operation and then issue an event to asynchronously augment this result with a probabilistic matching engine.

As used herein the term "matching engine" is intended to be broad in scope and may be an algorithm, software, process, method, rule-based set, or similar, which may also determine scoring directly or indirectly for and in relation to certain predetermined data characteristics.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

In addition to the processes and implementations of the present invention described thus far, the invention may also be used for data systems, archived data retrieval systems, database operations, real-time data collection systems, near real-time data acquisition systems, and other types of systems and devices therein containing the same or similar applications and uses.

What is claimed is:

1. A method for removing suspect duplicate data in a database having a plurality of datasets with predefined searchable informational characteristics for a suspect processing transaction, comprising:

selecting a plurality of matching engines, each matching engine for creating information for a suspect table of the respective matching engine and determining weights and scores of the respective matching engine, wherein the plurality of matching engines comprises a default matching engine (DME) for determining weights and scores for DME assessments and storing suspect information to a Suspect table, and one or more predetermined auxiliary matching engines (AMEs) for determining weights and scores and updating the suspect information by storing records in a Suspect Augment table, gathering associated records from the datasets for analysis, defining one or more external logics having logic criteria for:
(i) relating results of the matching engines for comparative assessment in a predetermined manner and
(ii) providing ordered priority of matching engine results to identify suspect candidates, wherein the one or more external logics comprise an external logic component (ELC), having predefined logic criteria for matching which matching engine result of one or more of the one or more AMEs will be comparatively assessed with matching engine results of the DME determined weights and scores, and an external default logic (EDC) with rules execution for providing priority of matching engine results assessed by the matching engines to identify the result, creating select information characteristics in the respective suspect tables, determining the respective weights and scores from the matching engines in accordance with the predetermined manner and the logic criteria, and producing a result indicating a presence or absence of one or more suspect candidates in relation to the plurality of datasets.

2. The method of claim 1, wherein the one or more AMEs is determined in direct relation to predetermined external rules for a particular transaction.

3. The method of claim 2, wherein the matching engine result includes an effective suspect type criteria.

4. The method of claim 3, wherein the records are populated in relation to the results of the DME.

5. The method of claim 4, wherein the one or more AMEs are invoked in one of real-time or near real-time.

6. The method of claim 5, wherein a DME stores suspect information to the Suspect table and the one or more AMEs updates suspect information by storing records to the Suspect Augment table.

7. The method of claim 6, wherein the result includes an identified duplicate suspect candidate.

8. An ordered system for comparatively assessing in a predefined manner, in a single pass, predefined characteristics of individual results of a plurality of matching engines in relation to a plurality of customer data in one or more databases for an invoked transactional process, comprising:

identifying a plurality of records from one or more datasets of client data having possible duplicate data therein, selecting a first matching engine and a second matching engine, wherein each matching engine is for creating information for an information table of the respective matching engine and determining weights and scores of the respective matching engine, wherein the first matching engine comprises a default matching engine (DME) for determining weights and scores for DME assessments and storing suspect information to an information table of the DME, and the second matching engine comprises one or more predetermined auxiliary matching engines (AMEs) for determining weights and scores and updating the suspect information by storing records in one or more information tables of the AMEs, defining a plurality of external logics having a plurality of logic criteria for:

(i) relating results of the matching engines for comparative assessment in a predetermined manner and (ii) providing ordered priority of matching engine results to identify suspect candidates, wherein the plurality of external logics comprise an external logic component (ELC), having predefined logic criteria for matching which matching engine result of one or more of the one or more AMEs will be comparatively assessed with matching engine results of the DME determined weights and scores, and an external default logic (EDC) with rules execution for providing priority of matching engine results assessed by the matching engines to identify the result, populating a first information table from a first matching engine with select characteristics, creating a second information table from a second matching engine with select characteristics, determining the respective weights and scores from the information tables of the respective matching engines in accordance with the predetermined manner and the logic criteria, and producing a result identifying one or more records of the dataset for removal.

9. The system of claim 8, wherein the information table of the second matching engine comprises data criteria as a subset of the information table of the first matching engine.

10. The system of claim 9, wherein the one or more AMEs is determined in direct relation to predetermined external rules for a particular transaction and the one or more AMEs are invoked in one of real-time or near real-time.

11. The system of claim 10, wherein the first matching engine stores candidate information to the information table of the DME and the one or more AMEs updates candidate information by storing records to the one or more information tables of the AMEs.

12. The system of claim 11, wherein the information table of the first matching engine is a suspect table.

13. A computer program product for identifying and ranking, in one pass, suspect duplicate data in a database having a plurality of datasets with predefined searchable informational characteristics for a suspect processing transaction, the computer program product comprising a computer-readable storage medium having computer-readable program code portions stored therein, the computer-readable program code portions comprising: a first executable portion for:

selecting a plurality of matching engines, each matching engine for creating information for a suspect table of the respective matching engine and determining weights and scores of the respective matching engine, wherein the plurality of matching engines comprises a default matching engine (DME) for determining weights and scores for DME assessments and storing suspect information to a Suspect table, and one or more predetermined auxiliary matching engines (AMEs) for determining weights and scores and updating the suspect information by storing records in a Suspect Augment table, gathering associated records from the datasets for analysis, defining one or more external logics having logic criteria for:

(i) relating results of the matching engines for comparative assessment in a predetermined manner and (ii) providing ordered priority of matching engine results to identify suspect candidates, wherein the one or more external logics comprise an external logic component (ELC), having predefined logic criteria for matching which matching engine results of one or more of the one or more AMEs will be comparatively assessed with matching engine results of the DME determined weights and scores, and an external default logic (EDC) with rules execution for providing priority of matching engine results assessed by the matching engines to identify the result, creating select information in the respective suspect tables, determining the respective weights and scores from the matching engines in accordance with the predetermined manner and the logic criteria, and producing a result having a presence or absence of a suspect candidate in relation to the plurality of datasets.

14. The product of claim 13, wherein the one or more AMEs are invoked in one of real-time or near real-time.

* * * * *